(12) United States Patent
Yu

(10) Patent No.: US 11,825,005 B2
(45) Date of Patent: Nov. 21, 2023

(54) DISPLAY DEVICE

(71) Applicant: WUHAN CHINA STAR OPTOELECTRONICS TECHNOLOGY CO., LTD., Hubei (CN)

(72) Inventor: Dongqing Yu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 494 days.

(21) Appl. No.: 17/051,316

(22) PCT Filed: Sep. 16, 2020

(86) PCT No.: PCT/CN2020/115581
§ 371 (c)(1),
(2) Date: Oct. 28, 2020

(87) PCT Pub. No.: WO2022/000801
PCT Pub. Date: Jan. 6, 2022

(65) Prior Publication Data
US 2023/0111838 A1    Apr. 13, 2023

(30) Foreign Application Priority Data

Jun. 28, 2020    (CN) .......................... 202010598333.4

(51) Int. Cl.
*H04M 1/02*    (2006.01)

(52) U.S. Cl.
CPC ....... *H04M 1/0264* (2013.01); *H04M 1/0266* (2013.01); *H04M 2201/38* (2013.01)

(58) Field of Classification Search
CPC ............. H04M 1/0264; H04M 1/0266; H04M 2201/38
See application file for complete search history.

(56) References Cited

U.S. PATENT DOCUMENTS

| | | | |
|---|---|---|---|
| 2016/0191097 A1* | 6/2016 | Huh | H04R 5/02 455/575.1 |
| 2018/0011373 A1* | 1/2018 | Zhou | G02F 1/13454 |
| 2018/0124898 A1 | 5/2018 | Kwon et al. | |
| 2019/0158643 A1* | 5/2019 | Zhang | H04M 1/0277 |
| 2019/0286192 A1 | 9/2019 | Cao et al. | |

(Continued)

FOREIGN PATENT DOCUMENTS

| | | |
|---|---|---|
| CN | 106935144 A | 7/2017 |
| CN | 107248374 A | 10/2017 |

(Continued)

*Primary Examiner* — Ernest G Tacsik

(57) ABSTRACT

The present application proposes a display device, which includes middle frame and a display panel disposed in the middle frame, wherein the display device includes a first non-display area between the middle frame and a display area of the display panel, and at least one perforated area enclosed by a first arc and a second arc; and wherein at least one first through hole is provided in the perforated area. In the present application, the perforated area is arranged in the first non-display area, which reduces the visibility of the perforated area when the display device is used, increases the screen-to-body ratio of the display device, and improves the product quality.

15 Claims, 6 Drawing Sheets

(56) References Cited

U.S. PATENT DOCUMENTS

| | | |
|---|---|---|
| 2019/0320049 A1 | 10/2019 | Nam et al. |
| 2020/0166814 A1* | 5/2020 | Guan et al. |
| 2020/0176526 A1* | 6/2020 | Yoon .................... G09G 3/3225 |
| 2021/0051272 A1* | 2/2021 | Liu ...................... G06F 1/1686 |
| 2021/0063781 A1 | 3/2021 | Zhang et al. |
| 2022/0190294 A1* | 6/2022 | Liu ........................ H10K 71/00 |

FOREIGN PATENT DOCUMENTS

| | | |
|---|---|---|
| CN | 107643638 A | 1/2018 |
| CN | 108010436 A | 5/2018 |
| CN | 108333810 A | 7/2018 |
| CN | 108449448 A | 8/2018 |
| CN | 108600455 A | 9/2018 |
| CN | 207968553 U | 10/2018 |
| CN | 209215791 U | 8/2019 |
| CN | 209330497 U | 8/2019 |
| CN | 110262108 A | 9/2019 |
| CN | 209946442 U | 1/2020 |
| CN | 111107185 A | 5/2020 |
| CN | 111123572 A | 5/2020 |
| WO | 2016035196 A1 | 3/2016 |

* cited by examiner

DISPLAY DEVICE

BACKGROUND OF INVENTION

Field of Invention

The present application relates to the field of display technology, and in particular to a display device.

Description of Prior Art

With the development of society, people have put forward higher requirements for screen-to-body ratios of display devices, and how to reduce a display area occupied by functional components of a display device and increase a screen-to-body ratio is a major development trend.

A signal receiving terminal of the functional components in the existing display device, such as a camera, is often disposed at one side of the display device by perforation to meet functional requirements, and a location of the perforated area is conspicuous and makes it difficult for the display device to lift the screen-to-body ratio, thus impacting product quality.

Therefore, there is an urgent need to develop a new display device to solve the above technical problems.

SUMMARY OF INVENTION

The present application provides a display device, which is used to solve the problem that the position of the perforated area of the existing display device is conspicuous and hinders the increase of the screen-to-body ratio of the display device.

The present application proposes a display device including a middle frame and a display panel disposed in the middle frame, wherein the display device includes a first non-display area between the middle frame and a display area of the display panel, and at least one perforated area enclosed by a first arc and a second arc; and wherein at least one first through hole is provided in the perforated area.

In the display device provided by the present application, the perforated area is defined in the first non-display area, the first arc is disposed at a side of the perforated area close to the middle frame, the second arc is disposed at another side of the perforated area close to the display area, and the first arc and the second arc have different curvatures.

In the display device provided by the present application, the middle frame includes four enclosing first sides, and the display area includes four enclosing second sides; and the perforated area is defined between adjacent ones of the first sides and the second sides.

In the display device provided by the present application, the first arc and one of the first sides have a first overlapping portion; or the second arc and one of the second sides have a second overlapping portion; or the first arc and one of the first sides have the first overlapping portion, and the second arc and one of the second sides have the second overlapping portion.

In the display device provided by the present application, the first side has a third arc, and the second side has a fourth arc;

the first arc and the third arc have a first overlapping portion; or the second arc and the fourth arc have a second overlapping portion; or the first arc and the third arc have the first overlapping portion, and the second arc and the fourth arc have the second overlapping portion.

In the display device provided by the present application, the first arc and the third arc have a first parallel portion; or the second arc and the fourth arc have a second parallel portion; or the first arc and the third arc have the first parallel portion, and the second arc and the fourth arc have the second parallel portion.

In the display device provided by the present application, the display device includes 2N number of the perforated areas, the perforated areas are symmetrically arranged with respect to a first symmetry axis along a first direction or a second symmetry axis along a second direction of the display area; and wherein the first direction is parallel to an extension direction of a scan line of the display panel, the second direction is parallel to an extension direction of a data line of the display panel, and N is a positive integer.

In the display device provided by the present application, the display panel further includes a second non-display area surrounding the display area, and the second non-display area is defined in the first non-display area;

the perforated area is defined in an area of the first non-display area other than the second non-display area; or the perforated area and the second non-display area have a third overlapping portion.

In the display device provided by the present application, the second non-display area has a third side, and the perforated area and the third side have a sixth overlapping portion.

In the display device provided by the present application, the third side has a fifth arc, and the perforated area and the fifth arc have a third parallel portion.

In the display device provided by the present application, the perforated area and the fifth arc have a third overlapping portion.

In the display device provided by the present application, the perforated area is disposed in the display area, and the first arc is disposed at a side of the perforated area closed to one of second sides of the display area, and the second arc is arranged at a side of the perforated area away from of the second side; and wherein the perforated area is defined between adjacent ones of the second sides, and the first arc and the second side have a fourth overlapping portion.

In the display device provided by the present application, the first arc and the fourth arc of the second side have a fourth overlapping portion.

In the display device provided by the present application, the first arc and the fourth arc of the second side have a fourth parallel portion.

In the display device provided by the present application, a pixel density in the perforated area is smaller than a pixel density in an area of the display area other than the perforated area.

In the display device provided by the present application, the display area includes a third non-display area, and the perforated area is defined in the third non-display area.

In the display device provided by the present application, the first through hole has a hole edge, and the hole edge has a fifth overlapping portion with the first arc and/or the second arc.

In the display device provided by the present application, the display device further includes a rotating member, and the display device in the perforated area is rotatably disposed on the display device through the rotating member.

In the display device provided by the present application, the display device further includes a functional component, and a signal receiving terminal of the functional component is disposed in the perforated area of the display device.

In the display device provided by the present application, a signal receiving terminal is engaged or bonded in the first through hole.

In the present application, the perforated area is arranged in the first non-display area, which reduces visibility of the perforated area when the display device is used, increases a screen-to-body ratio of the display device, and improves the product quality.

BRIEF DESCRIPTION OF DRAWINGS

The technical solutions and other beneficial effects of the present application will be made obvious by describing in detail the specific implementation manners of the present application in conjunction with the accompanying drawings.

DETAILED DESCRIPTION OF PREFERRED EMBODIMENTS

Figure 1:
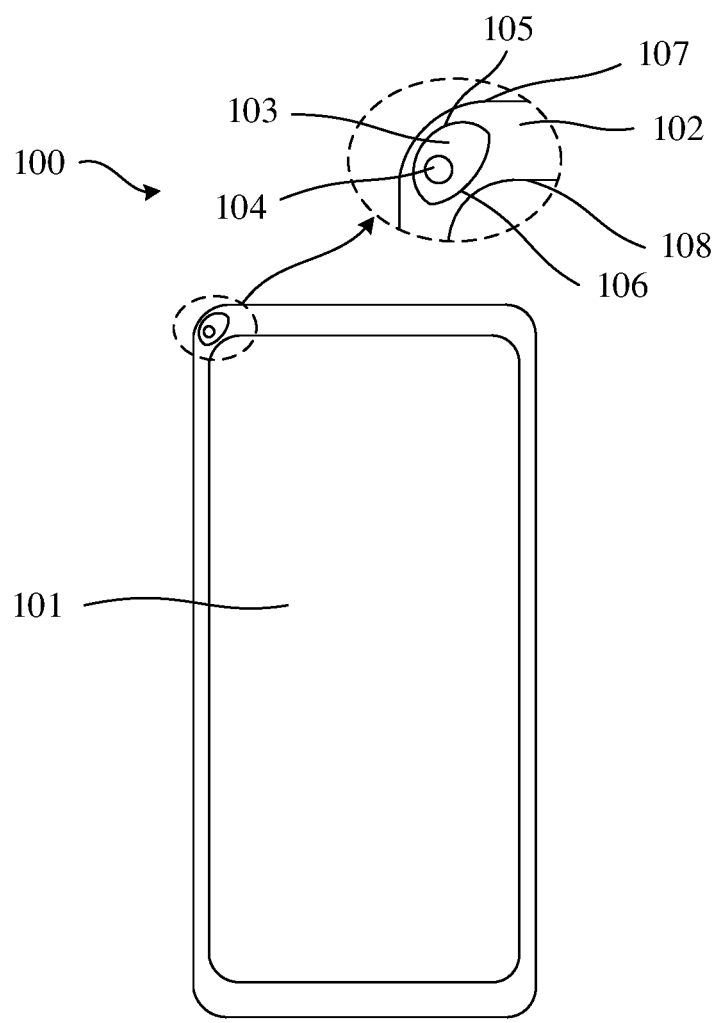
FIG. 1 is a first schematic diagram of the display device of the present application.

The present application provides a display device and a splicing device. In order to make the purpose, technical solution, and effect of the present application clearer and definite, and the application will be further described in detail below with reference to the drawings and embodiments. It should be understood that the specific embodiments described herein are only used to explain the application, and not used to limit the application.

The existing display device has the problem that the position of the perforated area is too conspicuous, thus impacting the increase of the screen-to-body ratio of the display device. In view of this, the present application proposes a display device.

Referring to FIG. 1 to FIG. 5, the display device 100 includes a middle frame and a display panel located in the middle frame.

The display device 100 includes a first non-display area 102 defined between the middle frame and the display area 101 of the display panel. The first non-display area 102 includes at least one perforated area 103 enclosed by a first arc 105 and a second arc 106.

At least one first through hole 104 is provided in the perforated area 103.

In this embodiment, the display panel may be a liquid crystal display panel, or an organic light-emitting diode (OLED) display panel, or other types of display panels, which is not particularly limited herein.

When the display panel is a liquid crystal display panel, the display device 100 is a liquid crystal display device, and the display device 100 may further include a backlight module.

The backlight module is located at a side of the display device 100 away from the display area 101.

The backlight module may include a second through hole corresponding to the first through hole 104.

Alternatively, the backlight module may include a first opening, and the first opening is arranged corresponding to the perforated area 103.

Alternatively, the backlight module may include a light-shielding area, and the light-shielding area is provided corresponding to the perforated area 103.

In this embodiment, a first arc center of the first arc 105 may be located at the side of the first arc 105 close to the display area 101, or may be located at the side of the first arc 105 far away from the display area 101, which is not particularly limited herein.

In this embodiment, the first arc 105 is located at a side of the perforated area 103 close to the middle frame, and the second arc 106 is located at a side of the perforated area 103 close to the display area 101. On the other hand, the first arc 105 and the second arc 106 have different curvatures.

In this embodiment, the display device 100 further includes a functional component, and the signal receiving terminal of the functional component is located in the perforated area 103 of the display device 100.

In this embodiment, the functional component may be one or more of a camera component, a fingerprint unlocking component, a light sensor, or a distance sensor.

In this embodiment, the signal receiving terminal of the functional component may be disposed in the first through hole 104.

When the functional component is a camera component, the signal receiving terminal may be a camera.

In this embodiment, the first through hole 104 may have a regular shape such as a circle, an ellipse, a square, a rectangle, or other irregular shapes, which is not particularly limited herein.

In this embodiment, when the signal receiving terminal is disposed in the first through hole 104, a shape of the signal receiving terminal matches the shape of the first through hole 104, and the signal receiving terminal is engaged or bonded in the first through hole 104, which is beneficial to preventing the signal receiving terminal from being loosely fixed in the first through hole 104, causing the signal receiving terminal to loosen or fall off, which impacts the quality of the display device.

Alternatively, when the signal receiving terminal is arranged in the first through hole 104, a filling layer is arranged between the signal receiving terminal and the first through hole 104, so that even if the signal receiving terminal does not matches the first through hole 104 in shapes, the signal receiving terminal can be engaged or bonded and fixed in the first through hole 104.

In the present application, by arranging the perforated area 103 in the first non-display area 102, the visibility of the perforated area 103 when the display device 100 is used is reduced, and the screen-to-body ratio of the display device 100 is improved, thereby improving product quality.

The technical solution of the present application will now be described in conjunction with specific embodiments.

Embodiment 1

Figure 2:
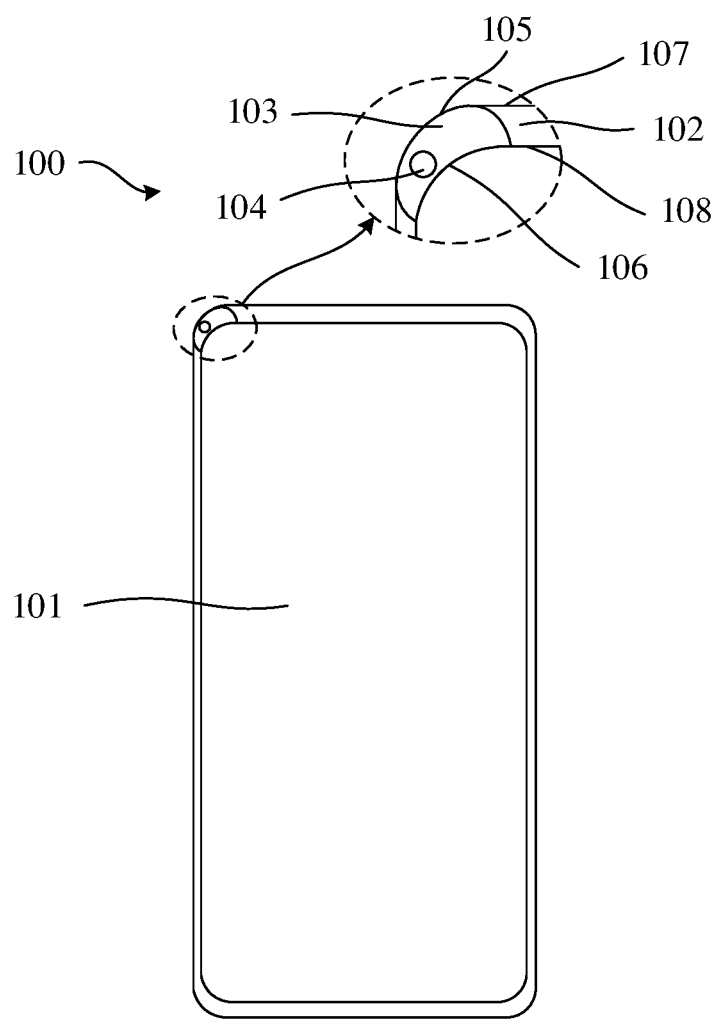
FIG. 2 is a second schematic diagram of the display device of the present application.

Referring to FIG. 1 and FIG. 2, the middle frame includes four enclosing first sides 107, and the display area 101 includes four enclosing second sides 108.

The perforated area 103 is located between adjacent ones of the first sides 107 and the second sides 108.

In this embodiment, the first arc 105 and the first side 107 may have a first overlapping portion.

In this embodiment, the second arc 106 may have a second overlapping portion with the second side 108.

In this embodiment, the first arc 105 may have a first overlapping portion with the first side 107, and the second arc 106 may have a second overlap with the second side 108.

When the first arc 105 and the first side 107 have the first overlapping portion, the first arc 105 may have an overlapping portion with adjacent ones of the first sides 107 close to the first arc 105 at the same time, or the first arc 105 may also have an overlapping portion with any adjacent one of the first sides 107 close to the first arc 105.

When the second arc 106 and the second side 108 have the second overlapping portion, the second arc 106 may have an overlapping portion with adjacent ones of the second side 108 close to the second arc 106 at the same time, or the second arc 106 may also have an overlapping portion with any adjacent one of the second side 108 close to the second arc 106.

Similarly, when the first arc 105 and the first side 107 have the first overlapping portion, and the second arc 106 and the second side 108 have the second overlapping portion, the first arc 105 may have an overlapping portion with adjacent ones of the first sides 107 close to the first arc 105 at the same time, or the first arc 105 may also have an overlapping portion with any adjacent one of the first sides 107 close to the first arc 105; meanwhile, the second arc 106 may have an overlapping portion with adjacent ones of the second side 108 close to the second arc 106 at the same time, or the second arc 106 may also have an overlapping portion with any adjacent one of the second side 108 close to the second arc 106.

In this embodiment, the first side 107 has a third arc, and the second side 108 has a fourth arc.

In this embodiment, the first arc 105 and the third arc may have a first parallel portion.

Alternatively, the second arc 106 may have a second parallel portion with the fourth arc.

Alternatively, the first arc 105 and the third arc have the first parallel portion, and the second arc 106 and the fourth arc have the second parallel portion.

In this embodiment, a first distance between the first arc 105 and the third arc in the first parallel portion may be greater than or equal to 0, and when the first distance is equal to 0, the first arc 105 overlaps the third arc.

Similarly, ae second distance between the second arc 106 and the fourth arc in the second parallel portion may be greater than or equal to 0, and when the second distance is equal to 0, the second arc 106 overlaps the fourth arc.

In this embodiment, the first arc 105 and the third arc may have the first overlapping portion, and the first arc 105 may partially or completely overlap the third arc, which is not particularly limited herein.

In this embodiment, the second arc 106 and the fourth arc may have the second overlapping portion, and the second arc 106 may partially or completely overlap the fourth arc, which is not particularly limited herein.

In this embodiment, while the first arc 105 and the third arc have the first overlapping portion, the second arc 106 may have the second overlapping portion with the fourth arc.

The first arc 105 and the first side 107 have the first overlapping portion, and/or the second arc 106 and the second side 108 have the second overlapping portion, such that an utilization area of the perforated area 103 between adjacent ones of the first sides 107 and the second sides 108 is increased. The first arc 105 and the third arc have the first parallel portion, and/or the second arc 106 and the fourth arc have the second parallel portion, such that the utilization area of the perforated area 103 between adjacent ones of the first sides 107 and the second sides 108 is further improved, thus beneficial to increasing the screen-to-body ratio of the display device 100. Especially, when the first arc 105 and the third arc of the first side 107 have the first overlapping portion, and the second arc 106 and the fourth arc of the second side 108 have the second overlapping portion, the first arc 105 of the perforated area 103 is attached to an R angle formed by adjacent one of the first sides 107, and the second arc 106 of the perforated area 103 is attached to the fourth arc of the second side 108, such that the utilization area of the perforated area 103 between adjacent ones of the first sides 107 and the second sides 108 is maximized, which is beneficial to increasing the screen-to-body ratio of the display panel.

In this embodiment, by arranging the perforated area 103 between the adjacent first side 107 and the adjacent second side 108, the visibility of the perforated area 103 when the display device 100 is used is reduced, and the screen-to-body ratio of the display device 100 is improved, thereby improving product quality.

Embodiment 2

Figure 3:
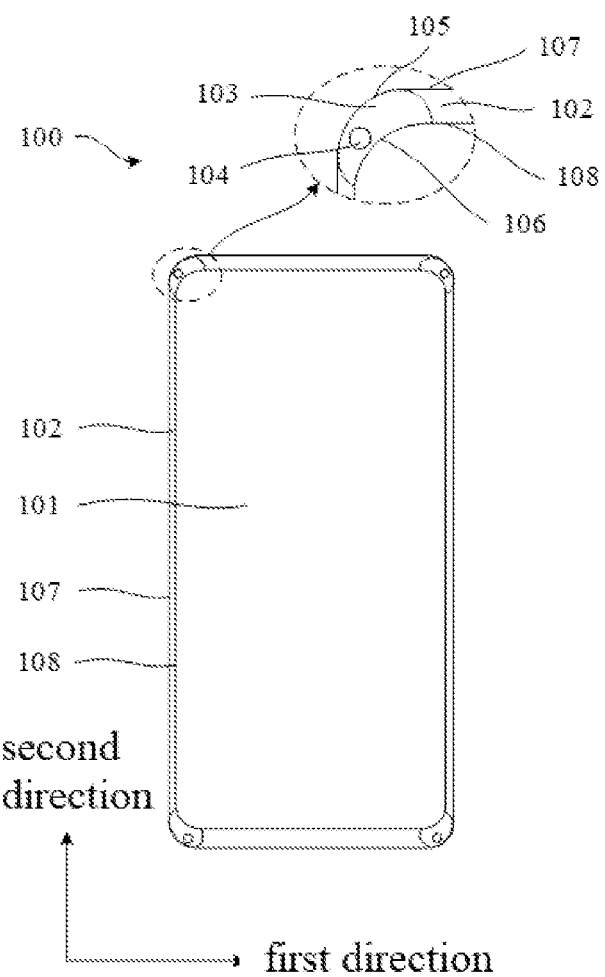
FIG. 3 is a third schematic diagram of the display device of the present application.

Referring to FIG. 3, this embodiment is the same as or similar to the Embodiment 1, except that:

The display device 100 includes 2N number of the perforated areas 103, and the perforated areas 103 are symmetrically arranged with respect to a first symmetry axis along a first direction or a second symmetry axis along a second direction of the display area 101.

The first direction is parallel to an extension direction of a scan line of the display panel, and the second direction is parallel to an extension direction of a data line of the display panel, and N is a positive integer.

original translation 10

In this embodiment, when the perforated areas 103 are symmetrically arranged with respect to a first symmetry axis or a second symmetry axis, numbers of the perforated areas 103 located on opposite sides of the first symmetry axis are the same.

Since the plurality of perforated areas 103 are symmetrically arranged in the first non-display area 102, the signal receiving terminals of the plurality of functional components are respectively arranged in the plurality of perforated areas 103, which is beneficial for the functional components to obtain target information from the signal receiving terminals in different ones of the perforated areas 103, thus being beneficial to improving the resolution, accuracy and, other parameters of the functional components. Meanwhile, because the signal receiving terminals may be distributed in a plurality of the perforated areas 103, under the premise of ensuring the resolution, accuracy and, other parameters of the functional components, the size of the single signal receiving terminal can be reduced accordingly, and further, the perforated area 103 accommodating the signal receiving terminal can be accommodated can be reduced accordingly, which is beneficial to increasing the screen-to-body ratio of the display device 100 and improving the quality of the display device 100.

In this embodiment, by providing 2N number of the perforated areas 103 symmetrically arranged with respect to the symmetry axis of the display area 101, it is beneficial to increasing the number of signal receiving terminals of the functional components 103 without increasing the areas of the perforated areas 103, thereby improving the performance parameters of the functional components such as resolution and accuracy. Meanwhile, under the premise of ensuring the performance of the functional components, the size of the single signal receiving terminal can be reduced accordingly, thereby further reducing the area of the single perforated area 103, which is beneficial to increasing the screen-to-body ratio of the display device 100 and improving product quality.

Embodiment 3

Figure 4:
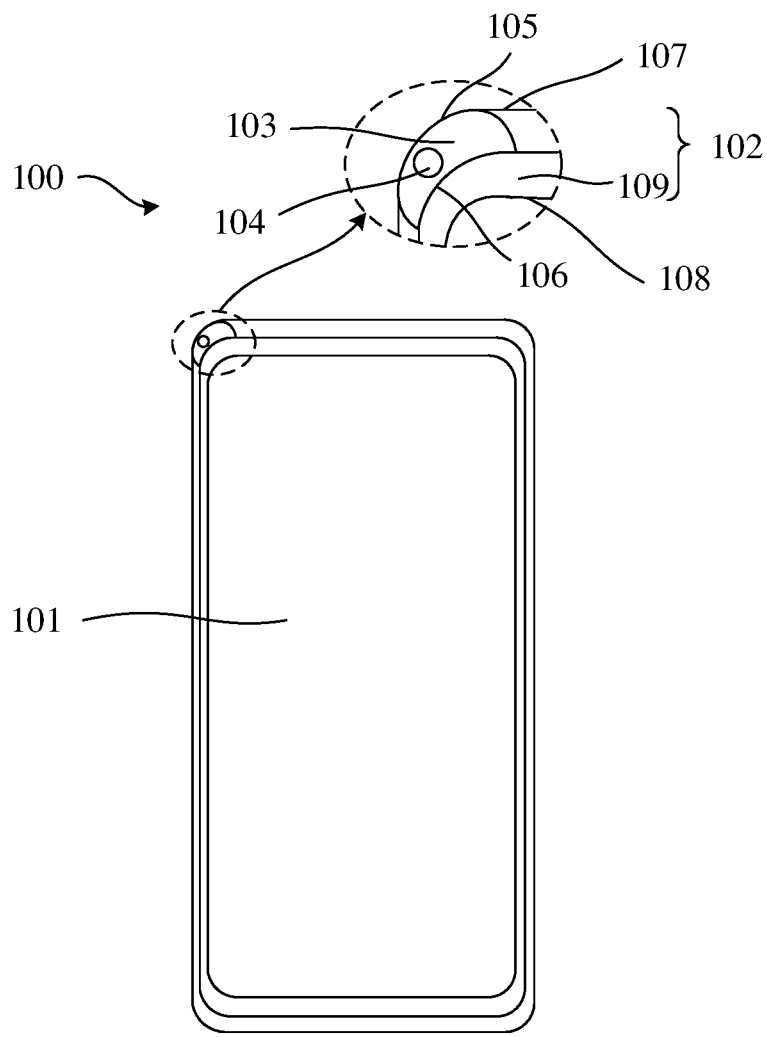
FIG. 4 is a fourth schematic diagram of the display device of the present application.

Referring to FIG. 4, this embodiment is the same as or similar to the above-mentioned embodiments, except that:

The display panel further includes a second non-display area 109 surrounding the display area 101, and the second non-display area 109 is located in the first non-display area 102.

In this embodiment, the perforated area 103 is located in an area of the first non-display area 102 other than the second non-display area 109.

Alternatively, the perforated area 103 and the second non-display area 109 have a third overlapping portion.

In this embodiment, the perforated area 103 is located in an area of the first non-display area 102, the first non-display area 102 including/encompassing the second non-display area 109, the second non-display area 109 may include a third side.

The perforated areas 103 may be defined between the adjacent ones of the first side 107 and the third sides.

The perforated area 103 may have a sixth overlapping portion with the third side.

In addition, the third side may include a fifth arc (that is, the third side may be curved), and the second arc 106 may have a third parallel portion with the fifth arc. The third distance between the second arc 106 and the fifth arc in the third parallel portion may be greater than or equal to zero. When the third distance is equal to 0, the second arc 106 and the fifth arc have a third overlapping portion.

The reason for the arrangement of the sixth overlapping portion, the third parallel portion, and the third overlapping portion is the same as or similar to that for the second overlapping portion, the second parallel portion, and the second overlapping portion in Embodiment 1, which is not repeated herein for brevity.

When the perforated area 103 is located in the area of the first non-display area 102 other than the second non-display area 109, the perforated area 103 is located outside the display panel, to prevent the setting of the perforation area 103 from changing the manufacturing process of the display panel, which is beneficial to simplifying the manufacturing process of the display panel and improving the product yield of the display panel.

In this embodiment, when the perforated area 103 and the second non-display area 109 have a third overlapping portion, the first non-display area 102 may overlap the second non-display area 109, that is, the first non-display area 102 and the second non-display area 109 are integrally provided. In this case, the first non-display area 102 and the perforated area 103 are both located on the display panel, which is beneficial to reducing the area of the non-display area and improving the screen-to-body ratio of the display device 100.

In this embodiment, the second non-display area 109 is defined around the display area 101 on the display panel.

When the perforated area 103 is located in an area of the first non-display area 102 other than the second non-display area 102, the perforated area 103 is located outside the display panel, which is beneficial to simplifying the manufacturing process of the display panel and improving its product yield. When the perforated area 103 and the second non-display area 109 have a third overlapping portion, the first non-display area 102 may overlap the second non-display area 109, which is beneficial to increasing the screen-to-body ratio of the display device 100 and improving product quality.

Embodiment 4

Figure 5:
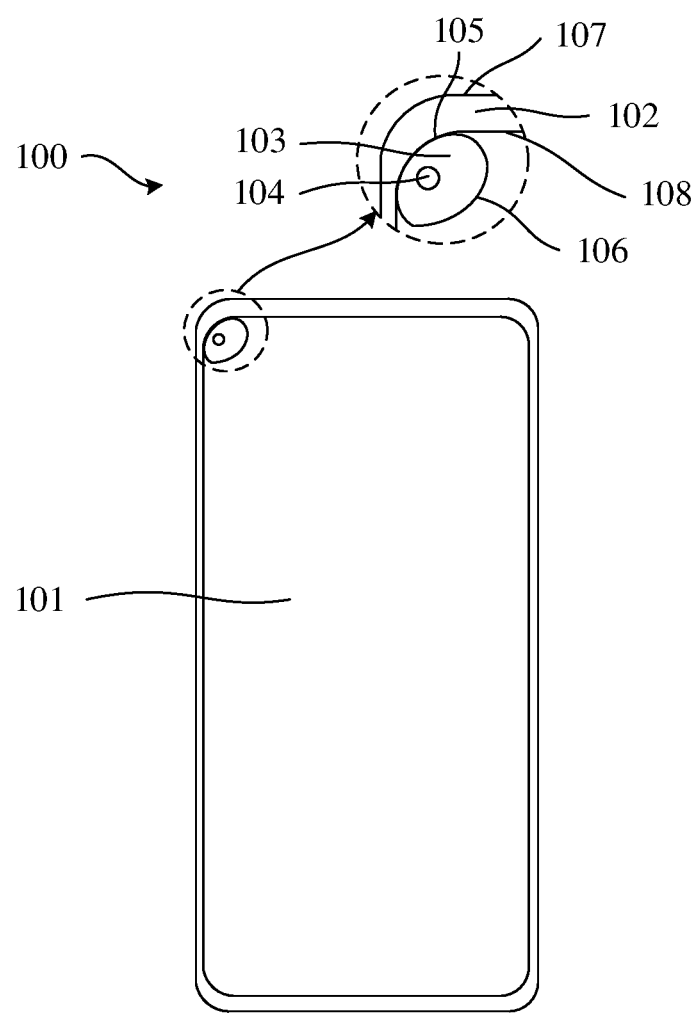
FIG. 5 is a fifth schematic diagram of the display device of the present application.

Referring to FIG. 5, this embodiment is the same as or similar to the foregoing embodiment, except that:

The perforated area 103 is defined in the display area 101, the first arc 105 is located at the side of the perforated area 103 close to the second side 108 of the display area 101, and the second arc 106 is located at the side of the perforated area 103 away from the second side 108.

The perforated area 103 is located between adjacent ones of the second sides 108, and the first arc 105 and the second side 108 have a fourth overlapping portion.

In this embodiment, when the first arc 105 and the second side 108 have a fourth overlapping portion, the first arc 105, the first arc 105 may have an overlapping portion with adjacent ones of the second sides 108 close to the first arc 105 at the same time, or the first arc 105 may also have an overlapping portion with any adjacent one of the second sides 108 close to the first arc 105.

In this embodiment, the first arc 105 and the fourth arc have a fourth parallel portion, and a fourth distance between the first arc 105 and the fourth arc are in the fourth parallel portion may be greater than or equal to 0. When the fourth distance is equal to 0, the first arc overlaps the fourth arc.

In this embodiment, the first arc 105 and the fourth arc may have a fourth overlapping portion, wherein the first arc 105 may partially or completely overlap the fourth arc, which is not particularly limited herein.

The reason for the arrangement of the fourth overlapping portion, the fourth parallel portion, and the fourth overlapping portion is the same as or similar to that for the first overlapping portion, the first parallel portion, and the first overlapping portion in Embodiment 1, which is not repeated herein for brevity.

In this embodiment, a pixel density in the perforated area 103 may be less than a pixel density in an area of the display area 101 other than the perforated area 103.

In this embodiment, the display area 101 includes a third non-display area, and the perforated area 103 may be located in the third non-display area.

In this embodiment, by arranging the perforated area 103 in the display area 101 and located between adjacent ones of the second sides 108 of the display area 101, the visibility of the perforated area 103 when the display device 100 is used is reduced, and the screen-to-body ratio of the display device 100 is improved, thereby improving product quality.

Embodiment 4

Figure 6:
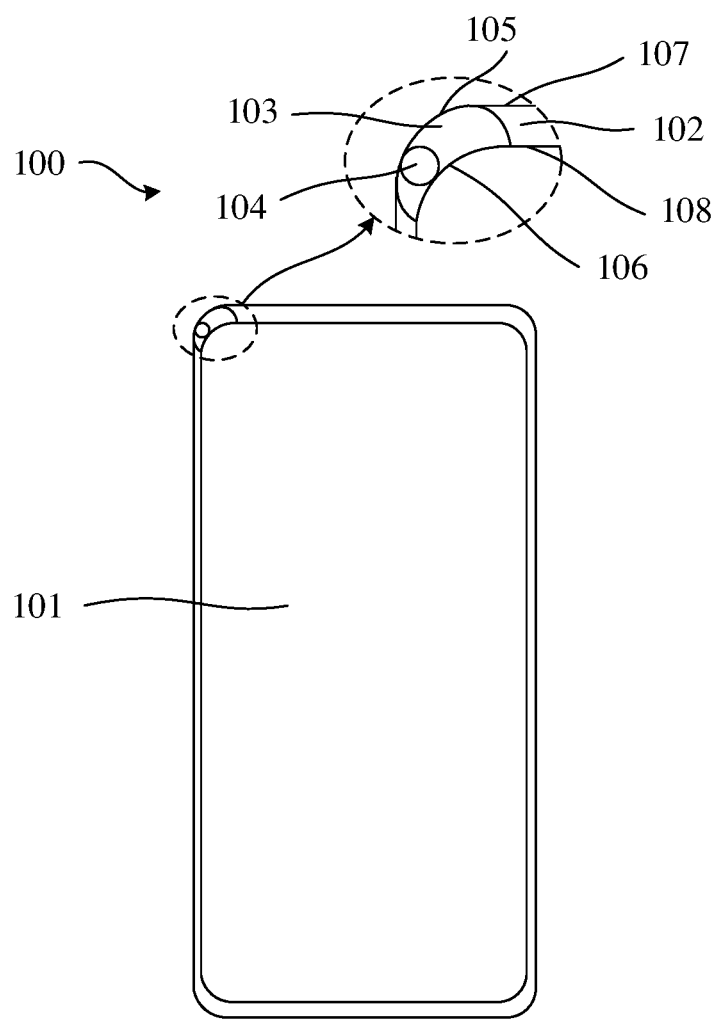
FIG. 6 is a sixth schematic diagram of the display device of the present application.

Referring to FIG. 6, this embodiment is the same as or similar to the foregoing embodiment, except that:

The first through hole 104 has a hole edge, and the hole edge has a fifth overlapping portion with the first arc 105 and/or the second arc 106.

In this embodiment, there may be one or more first through holes 104 in the perforated area 103. When there are multiple first through holes 104, the first through holes 104 and adjacent one of the hole edge may have a seventh overlapping portion. For example, when the shape of each of the first through holes 104 is circular, the hole edge of adjacent one of the first through holes 104 may be tangent; and when the shape of each of the first through holes is square or rectangular, adjacent ones of the first through holes 104 may at least partially share the hole edge therebetween.

In this embodiment, by providing a fifth overlapping portion between the hole edge of the first through hole 104 and the first arc 105 and/or the second arc 106, it is beneficial to reducing the area of the perforation area 103, thereby increasing the screen-to-body ratio of the display device 100 and improving product quality.

In the foregoing embodiments, the display device 100 may further include a rotating member, and the display device 100 in the perforated area 103 can be rotatably disposed on the display device 100 through the rotating member. In this embodiment, before rotating, the perforated area 103 may be located at the side of the display device 100 away from the display area 101, or the perforated area 103 may also be provided on the same side as the display area 101. When the perforated area 103 is located at the side of the display device 100 away from the display area 101, and when the display device 100 in the perforated area 103 is not rotated, a signal receiving terminal of the functional components in the perforated area 103 may be signal receiving terminals of a rear component. For example, when the functional component is a camera component, the signal receiving terminal of the rear component is a rear camera. After the display device 100 in the perforated area 103 is rotated, the signal receiving terminal of the functional components in the perforated area 103 may be the signal receiving terminal of a front component. For example, when the functional component is a camera component, the signal receiving terminal of the front component is a front camera. Through the arrangement of the rotating member, the front one and rear one of the same functional component can be realized, which is beneficial to avoiding the repeated setting of the functional components with the same function in the display device 100 to meet the requirements of setting the front one and the rear one, and save the internal space of the display device 100.

The present application proposes a display device, which includes middle frame and a display panel disposed in the middle frame, wherein the display device includes a first non-display area between the middle frame and a display area of the display panel, and at least one perforated area enclosed by a first arc and a second arc; and wherein at least one first through hole is provided in the perforated area. In the present application, the perforated area is arranged in the first non-display area, which reduces the visibility of the perforated area when the display device is used, increases the screen-to-body ratio of the display device, and improves the product quality.

It can be understood that for those of ordinary skill in the art, equivalent substitutions or changes can be made according to the technical solutions and inventive concepts of the present application, and all these changes or substitutions shall fall within the protection scope of the appended claims of the present application.

What is claimed is:

1. A display device, comprising a frame and a display panel disposed in the frame,
    wherein
    the display panel comprises a first non-display area between the display panel's perimeter and a display area of the display panel, and at least one perforated area entirely enclosed by a first arc and a second arc within the non-display area;
    the first arc and the second arc have different curvatures;
    at least one first through hole penetrating the display panel is provided in the perforated area;
    the frame comprises four enclosing first sides;
    the non-display area comprises four enclosing first sides with radiused corners;
    the display area comprises four enclosing second sides with radiused corners;
    the first arc and a radiused corner of the non-display area have a first overlapping portion; and
    the second arc and radiused corner of the display area have a second overlapping portion.

2. The display device according to claim 1, wherein the perforated area is defined in the first non-display area, the first arc is disposed at a side of the perforated area close to the frame, the second arc is disposed at another side of the perforated area close to the display area.

3. The display device according to claim 1, wherein the display panel further comprises a second non-display area surrounding the display area, and the second non-display area is defined in the first non-display area;
    the perforated area is defined in an area of the first non-display area other than the second non-display area; or
    the perforated area is overlapped with the second non-display area.

4. The display device according to claim 1, wherein the first arc is disposed at a side of the perforated area closed to one of second sides of the display area, and the second arc is arranged at a side of the perforated area away from of the second side; and
    wherein the perforated area is defined between adjacent ones of the second sides, and the first arc is overlapped with the second side.

5. The display device according to claim 1, wherein the first through hole has a hole edge, and the hole edge is overlapped with the first arc and/or the second arc.

6. The display device according to claim 1, wherein the display device further comprises a rotating member, and the display device in the perforated area is rotatably disposed on the display device through the rotating member.

7. The display device according to claim 1, wherein the display device further comprises a functional component, and a signal receiving terminal of the functional component is disposed in the perforated area of the display device.

8. The display device according to claim 1, wherein a signal receiving terminal is engaged or bonded in the first through hole.

9. The display device according to claim 2, wherein the perforated area is defined between adjacent ones of the first sides and the second sides.

10. The display device according to claim 9, wherein the first arc is overlapped with one of the first sides; and/or the second arc is overlapped with one of the second sides.

11. The display device according to claim 9, wherein the first arc is parallel to the first side; and/or the second arc is parallel to the second side.

12. The display device according to claim 9, wherein the display device comprises 2N number of the perforated areas, and the perforated areas are symmetrically arranged with respect to a first symmetry axis along a first direction or a second symmetry axis along a second direction of the display area; and wherein the first direction is parallel to an extension direction of a scan line of the display panel, and the second direction is parallel to an extension direction of a data line of the display panel, and N is a positive integer.

13. The display device according to claim 10, wherein the first side is curved;

the first arc is overlapped with the first side; and/or the second arc is overlapped with the second side.

14. The display device according to claim 4, wherein a pixel density in the perforated area is smaller than a pixel density in an area of the display area other than the perforated area.

15. The display device according to claim 4, wherein the display area comprises a third non-display area, and the perforated area is defined in the third non-display area.

\* \* \* \* \*